(12) United States Patent
Cooley

(10) Patent No.: US 11,477,947 B2
(45) Date of Patent: Oct. 25, 2022

(54) CONTAINER AND PLANT TRAY

(71) Applicant: International Plant Propagation Technology, Ltd., Gargrave Skipton (GB)

(72) Inventor: John Cooley, Gargrave Skipton (GB)

(73) Assignee: INTERNATIONAL PLANT PROPAGATION TECHNOLOGY LTD, Yorkshire (GB)

( * ) Notice: Subject to any disclaimer, the term of this patent is extended or adjusted under 35 U.S.C. 154(b) by 143 days.

(21) Appl. No.: 16/614,300

(22) PCT Filed: Jun. 13, 2018

(86) PCT No.: PCT/GB2018/051623
§ 371 (c)(1),
(2) Date: Nov. 15, 2019

(87) PCT Pub. No.: WO2018/229486
PCT Pub. Date: Dec. 20, 2018

(65) Prior Publication Data
US 2020/0170194 A1 Jun. 4, 2020

Related U.S. Application Data

(60) Provisional application No. 62/519,108, filed on Jun. 13, 2017.

(51) Int. Cl.
*A01G 9/029* (2018.01)

(52) U.S. Cl.
CPC .................. *A01G 9/0295* (2018.02)

(58) Field of Classification Search
CPC .......... A01G 9/0295; A01G 9/00; A01G 9/02; A01G 9/027; A01G 9/028; A01G 9/029; A01G 9/0296; A01G 9/021
See application file for complete search history.

(56) References Cited

U.S. PATENT DOCUMENTS

| | | | |
|---|---|---|---|
| 4,216,662 A | 8/1980 | Harris, Jr. et al. | |
| 2016/0198641 A1 | 7/2016 | Lee | |

FOREIGN PATENT DOCUMENTS

| | | |
|---|---|---|
| CA | 1070114 A | 1/1980 |
| DE | 20109317 U1 | 9/2001 |

(Continued)

OTHER PUBLICATIONS

International Search Report and Written Opinion for PCT/GB2018/051623, dated Sep. 18, 2018, 14 pages.

(Continued)

*Primary Examiner* — Kristen C Hayes
(74) *Attorney, Agent, or Firm* — Thomas | Horstemeyer, LLP

(57) ABSTRACT

A container for propagating or growing plants is configured to receive a substrate for propagating plants and comprises a drain hole, an inclined side wall, and a plurality of ribs positioned on the side wall and extending into the container. At least two ribs are arranged close to and parallel to one another, defining a channel therebetween through which air may flow, in use, when the container contains a substrate. In a plant tray comprising an array of cells, at least one cell comprises a rim, arranged around the drain hole on the underside of the cell, in which a thickness of the rim is greater than a thickness of the side wall. A plant tray comprising an array of cells having octagonal cell openings comprises a plurality of vents arranged between the cells and configured to allow air to flow through the tray top. A plant tray comprising vents in the tray top comprises vent rims arranged around the circumferences of the vents, the vent rims being configured to project downwards from the tray top.

36 Claims, 11 Drawing Sheets

(56) References Cited

FOREIGN PATENT DOCUMENTS

| DE | 20107881 U1 | 9/2002 | |
|---|---|---|---|
| DE | 202012010529 U1 | 1/2013 | |
| FR | 1252090 A * | 1/1961 | ............ A01G 9/029 |
| GB | 1535974 A | 12/1978 | |
| KR | 101866682 B1 | 6/2018 | |
| WO | 2006016100 A1 | 2/2006 | |
| WO | WO-2006016100 A1 * | 2/2006 | ............ A01G 9/021 |
| WO | 2015194929 A1 | 12/2015 | |
| WO | 2018229486 A1 | 12/2018 | |

OTHER PUBLICATIONS

German Examination Report for co-pending, related GB Application No. GB2000462.8, dated Apr. 14, 2021.
German Combined Search and Examination Report in co-pending, related GB Application No. GB2017237.5, dated Apr. 15, 2021.
Germany Search Report for co-pending related GB application No. GB2017237.5, dated Apr. 14, 2021.

* cited by examiner

Double rib

Triple rib

Quadruple rib

Air flow

CONTAINER AND PLANT TRAY

CROSS-REFERENCE TO RELATED APPLICATION(S)

This application is a national stage entry, under 35 U.S.C. § 371, of International Application Number PCT/GB2018/051623, filed Jun. 13, 2018, which claims priority to U.S. Provisional Application No. 62/519,108, filed Jun. 13, 2017. The entire contents of all of the applications identified in this paragraph are incorporated herein by reference.

The invention relates to a container for propagating or growing plants, and in particular to a plant tray for containing a substrate for propagating or growing plants.

BACKGROUND

Historically vegetable crops have been established by using a transplant, i.e., a plant that is lifted from one position and moved to a final field position, which is planted initially in the field and started from seed. These types of plants were called "bare root" plants but about 50 years ago there was a transition to use plants grown in containers or trays in greenhouses instead, which has now become the norm. Typically these containers are multi-cell trays with individual cells in the tray that keep the root ball of each plant separate which makes for easy pulling, transplanting and minimal plant shock. These trays are typically made from EPS Styrofoam, thermoformed plastic and more recently injection molded plastic.

Injection molded plastic trays have tended to become the most popular trays because of the features that can be placed in the tray and these designs have evolved in the last few years.

Typically all trays used to have a tapered cell leading to drain hole at the base of the cell out of which excess water passed and also in the case of well-designed trays, roots were forced out of this hole to be "air pruned" and thus create a better quality root system. "Air pruning" is a process where the roots are forced out of the cell into the dry air under the tray which kills the root tip and allows a lot more secondary roots to develop, thus providing a lot more younger, vigorous roots.

However, plants are not meant to grow in containers. To develop as nature intends, roots need to be able to grow out from the stem of the plant unhindered. In containers, the roots grow out until they hit the wall of the container and then circle the periphery of the container creating a knotted root ball which at best hinders plant growth once transplanted outdoors, and more commonly leads to plant death.

To overcome this problem, many tray designs have adopted the use of internal vertical ribs that run the height of the tray and are typically 4 off equispaced around the internal perimeter of the cell. This method has been in use for some 20-30 years now, and is effective in "training" the plant roots down to the drain hole, where once they are in open air will "air prune" and promote vigorous secondary healthy root growth. Healthy roots produce healthy plants. When roots naturally grow outward from the stem of the plant, once they reach the container wall they naturally start to circle round, until they hit a vertical rib wall. At this point the root is "trained" downward to the drain hole and out to be "air pruned."

However, one clear disadvantage still not addressed in the use of containers, and more so when the container "cell" is small in diameter with a single drain hole, as employed in vegetable propagation, is the poor drainage and aeration of the roots. "Waterlogged" cells are as detrimental to promoting good healthy cell growth as "circling roots." Nurseries need to get higher densities of plants in greenhouses, but also need to promote healthy root and plant growth. One recognised method of achieving healthy root and plant growth is to be able to dry the plants back regularly and then water them. This is known as the "dry wet cycle." The more "dry wet cycles" during the growth of a seedling the better the plant will be. Cells can however become easily waterlogged, and the density of cells in a tray means that there is often inadequate ventilation to the central cells and plants. Both these factors slow and hinder the "dry wet cycle."

It would therefore benefit this process if the tray design both allowed good drainage and aeration of the individual cell, and of the plant growing above.

SUMMARY OF THE INVENTION

The invention provides a container for propagating plants and a plant tray as defined in the appended independent claim, to which reference should now be made. Preferred or advantageous features of the invention are set out in dependent sub-claims.

Multiple Rib

In a first aspect, the invention provides a container for propagating (growing) plants, the container being configured to receive a substrate for propagating plants and comprising a drain hole, an inclined side wall, and a plurality of ribs positioned on the side wall and extending into the container, in which at least two ribs are arranged close to and parallel to one another, defining a channel therebetween through which air may flow, in use, when the container contains a substrate.

The at least two parallel ribs are positioned sufficiently close to one another that substrate does not fill the channel between the parallel ribs.

The provision of one or more channels through which air may flow, in use, may provide improved aeration of the substrate in the container, in use. The channels may also improve container drainage by providing a route through which excess water may drain out of the substrate. This may advantageously prevent the substrate from becoming waterlogged, and may create a better microclimate for plant growth. This may be especially beneficial where trays of plants are outside with rainfall causing heavy water-logging, resulting in poor plant growth and disease proliferation.

The at least two parallel ribs preferably extend over at least a portion of the side wall, and are preferably upwardly oriented, so that the ribs extend straight up the side wall in-plane with the central axis of the container.

The at least two parallel ribs form a U-shaped channel, or chimney, between the ribs and the side wall, so that the ribs and the side wall form three sides of the channel, and the fourth side of the channel opens into the interior of the container. Thus, the lateral separation of the parallel ribs may be referred to as the "width" of the channel, and the "height" of the ribs (the distance which the ribs protrude out of the side wall into the container) may be referred to as the "depth" of the channel.

The width and depth of the channel may be chosen by controlling the separation of the parallel ribs and the height of the ribs.

The width and depth of the channel are preferably sized so that, when the container is filled with substrate (such as soil, compost, peat, moss, or coir) the substrate does not fill the channel. By making the channel relatively narrow, for example, course substrate may not enter and obstruct the channel. Air may thus flow through the channel, in use, which may advantageously aerate the substrate. The channel may also provide a route for drainage of excess water.

The optimal width and depth of channel may depend on factors such as the coarseness of substrate which will be used in the container. For example, in a large container intended for propagation of large plants or trees, a course substrate may be used, so a larger channel may be used without being obstructed by substrate. Where the container is small, however, and intended to be filled with finer substrate, a smaller channel may be necessary in order to avoid the channel becoming blocked with substrate.

Known cells have not been formed with channels too deep and/or narrow to be filled with substrate, as moulders and designers of plant-containers conventionally aim to avoid the formation of any occluded areas which cannot be filled with substrate. Ribs are therefore typically formed far enough apart that substrate can fill the entire cell volume and fill around any ribs in the cell.

The at least two parallel ribs may be referred to as a set of parallel ribs.

Preferably, the container may comprise a plurality of sets of parallel ribs. For example, in a preferred embodiment the container may comprise four sets of two parallel ribs, forming four channels spaced around the circumference of the container.

In a preferred embodiment, the container may comprise three ribs arranged close to and parallel to one another, such that the three parallel ribs form two channels therebetween through which air may flow, in use, when the container contains a substrate.

In a preferred embodiment, the container may comprise four ribs arranged close to and parallel to one another, such that the four parallel ribs form three channels therebetween through which air may flow, in use, when the container contains a substrate.

Preferably the two or more parallel ribs are separated by a lateral distance of less than or equal to 5 mm, or 4 mm, or 3 mm, or 2 mm, or 1 mm. Thus, the channel may have a width of less than or equal to 5 mm, or 4 mm, or 3 mm, or 2 mm, or 1 mm.

Preferably the two or more parallel ribs project inwards from the side wall by a height of less than or equal to 5 mm, or 4 mm, or 3 mm, or 2 mm, or 1.5 mm. Thus, the channel may have a depth of less than or equal to 5 mm, or 4 mm, or 3 mm, or 2 mm, or 1.5 mm.

These dimensions may be particularly suitable for medium-coarseness substrate, for example substrate with a mean particle size of greater than 3 mm, and less than 8 mm, so that substrate does not enter the channel. In containers designed for use with substrate with a mean particle size above 8 mm, it may be suitable to increase the width and/or depth of the channel even further.

Preferably the height which the two or more parallel ribs project inwards from the side wall is substantially equal to the lateral separation of the parallel ribs. Thus the depth of the channel may preferably be substantially equal to the width of the channel.

The drain hole is defined in a lower portion of the container, so that water may drain out of the container through the drain hole. The drain hole may be defined in the bottom of the container.

The container may comprise a base, through which the drain hole is defined. Alternatively, the side wall may extend to the edge of the drain hole in the bottom of the container.

The parallel ribs may form a channel through which air may flow from the tray top to the drain hole, in use.

The two or more parallel ribs may be configured to extend from the edge of the drain hole to an upper section of the side wall. This may allow air to flow up the channel from the drain hole, in order to aerate the substrate and provide drainage.

The two or more parallel ribs may, for example, be configured to extend from the edge of the drain hole to an upper end of the container, so that the parallel ribs form a channel through which air may flow from the drain hole to the upper end of the container, in use. This may advantageously enable airflow up or down through the channels in a predetermined direction, allowing improved aeration and drainage of the substrate in the container.

The two or more parallel ribs may be configured to extend from the edge of the drain hole to an upper section of the side wall below the upper end of the container. The ribs may terminate below the upper end of the container so that, in use, the upper end of the chimney is not exposed above the substrate when the container is filled with substrate. This may be desirable, in order to prevent water from immediately draining down the channels when the surface of the substrate is watered.

Preferably the height of the parallel ribs is the same along their entire length, for example from the drain hole to the top of the side wall. In prior art trays, ribs are formed so that they decrease in height towards the bottom of a container as the side wall or base tapers towards the edge of the drain hole. This is easy for manufacturers to mould, and as ribs have previously been intended only to guide roots downwards towards the bottom of a container, it has not previously been desirable to form a rib all the way to the edge of the drain hole.

Preferably the parallel ribs are configured to maintain their height until they terminate at, or beyond, the edge of the drain hole. Thus the drain-hole end of the channel may be kept open, so that air may flow into or out of the channel through the open end.

Preferably the parallel ribs extend to the edge of the drain hole, and in which the height of the parallel ribs at the edge of the drain hole is at least 1 mm, or 2 mm, or 3 mm, or 4 mm, or 5 mm. This may ensure that the drain hole end of the channel is kept open, and not obstructed by substrate, so that air may flow into and out of the end of the channel.

In the present invention, it is desirable that the substrate not be able to occlude the channel at any point, so that air may flow along the length of the channel. By extending the parallel ribs to the edge of the drain hole at their full height, the ribs may form an open end of the channel at the drain hole. Thus, better air flow into or out of the channel via the drain hole may be provided, as the substrate is kept out of the channel by the parallel ribs, so that air may flow between the channel and the drain hole through the open end of the channel.

In a particularly preferred embodiment, the two or more parallel ribs are configured to extend into, or across, the drain hole. In this configuration, the ribs may thus support substrate inside the container, and prevent it from falling out of the container through the drain hole. By extending the channel into or across the drain hole, air flow into or out of the channel may also be improved, as this may ensure that the drain-hole-end of the channel is not obstructed by substrate.

Preferably, the container may comprise 2, or 3, or 4, or 5, or 6, or 8 sets of two, three or four parallel ribs, in which the sets of parallel ribs are spaced apart around the side wall of the container. Preferably the sets of parallel ribs, and thus the channels, may be evenly spaced around the side wall.

In a preferred embodiment, the container comprises a rim or boss, arranged around the drain hole on the underside of the container, in which a thickness of the rim is greater than a thickness of the side wall. The rim may advantageously strengthen the cell by reinforcing the drain hole, and may make the container more robust and less prone to damage during use.

Preferably the thickness of the rim is at least 1.5 times, or 2 times, or 3 times, or four times greater than a thickness of the side wall.

In a particularly preferred embodiment, a portion of the side wall may slope downwards to an edge of the drain hole, and the rim or boss comprises a flat bottom surface, so that the rim is configured to provide a flat surface area on the underside of the container. The rim may thus advantageously be abuttable against a mould ejector pin for ejecting the tray from a mould during manufacture.

The container may comprise a rim or boss as described below in relation to the second aspect of the invention.

The container may comprise a substrate contained in the container, so that the substrate does not fill the channel formed between the parallel ribs.

The container may be formed as an individual unit, for example a single plant pot.

Alternatively, the container may be a cell of a plant tray comprising a plurality of cells. The plant tray may comprise a tray-top defining the upper end of the cells.

As roots develop inside the cell of a tray they move outwards and hit the wall of the cell and typically start to circle around the cell. This is bad as circling roots lead to poor root architecture in the plant and poorer long term survival. In order to stop root circling many trays have used a vertical root training rib. These have been used for some 20 or 30 years now. These ribs are able to stop the circling and typically four vertical ribs have been used per cell, one on each wall.

Multiple Rib "Chimney": This invention builds on the benefits of the internal vertical ribs to "train" roots down, but by producing two or more parallel ribs alongside each other, where the width between ribs in conjunction with the height are designed so that the soil is forced to "bridge" the gap, an open "chimney" is created to both allow excess water to drain, whilst also introducing air into the cell to "oxygenate" or aerate it.

Rib distance and height is typically tailored to the soil medium (fine to coarse) to allow maximum "chimney" size whilst preventing soil from falling into the "chimney." Rib height from the wall of the cell can typically be between 1.5-5 mm. Distance between ribs can typically be between 1-5 mm. Multiple vertical ribs can also be employed to increase the "chimney" effect, though typically between 2 and 4 ribs per "chimney," and typically 3-6 "chimneys" per cell.

This invention increases the number of ribs in any one area of the cell to at least two ribs which creates a gap between the 2 parallel ribs which acts as a chimney within the cell, see FIG. 2e. This chimney stays an open void as soil will not flow into it but does fill the main cell area. The soil does not get into the chimney due to the dimensions i.e. the ribs have to be close together to avoid blockage with soil but open enough to create a useful chimney void. Any rib still deflects roots down but now the chimney acts as a method of helping to drain excess water out of the cell and also introduce air into the cell to oxygenate it. This makes for a much healthier microclimate within the cell. In the past some ribs have been used but have not flowed all the way to the base of the cell and have petered out towards the bottom of the cell thus any chimney has a blocked base to it and does not flow out to the opening below the drain hole. This design extends the rib all the way to the drain hole and has an option to extend it across the drain hole, see FIGS. 3a-3c.

The height of the ribs used can vary from 1.5 mm-5 mm and the distance between two parallel ribs when used for this purpose should be between 1 mm and 5 mm in order to create the chimney void. The point here is that soil will not fall into this chimney as the gap between the ribs is too small, there are many different soil grades hence a range is required here depending on the soil type and in turn crop type.

A further improvement of this concept is to have the ribs run at least up to the drain hole whilst maintaining rib height, or to extend beyond the drain hole, or to bridge the drain hole. In all instances it is desirable that the soil not be able to "bridge" the "chimney" before the drain hole is reached.

Ribs normally blend out to nothing well away from drain holes as this is easy to machine in mold making. With a more deliberate approach to mold making using tighter tolerances and also sharp corners with a small radius, which is not the normal convention, a rib running up closer to or directly adjacent to the drain hole can be achieved.

The combination of two or more parallel ribs with the ratios above, in addition to the ribs flowing at least to, and beyond the drain hole allow for an open "chimney" which in turn leads to optimal drainage and aeration and better plant performance, whilst also "training" roots downward without spiraling between "chimneys."

The combination of two or more parallel ribs with the above ratios and distances along with the ribs flowing to and even across the drain hole allow for an open chimney which in turn leads to optimal drainage and aeration and better plant performance.

In a preferred aspect of the invention, there is provided a method of propagating or growing plants comprising the steps of: placing substrate in a container according to the first aspect of the invention, so that the substrate fills the container but does not fill the channels formed by the parallel ribs, and air can flow through the channel.

Strengthening Rim

In a second aspect, the invention provides a plant tray for containing a substrate for propagating plants, in which the tray comprises a tray top and an array of cells, each cell being configured to receive a substrate for propagating plants and comprising a drain hole and an inclined side wall, in which at least one cell comprises a rim, arranged around the drain hole on the underside of the cell, in which a thickness of the rim is greater than a thickness of the side wall.

Preferably the rim, or boss, is suitable for abutting a mould ejector pin for ejecting the tray from a mould during manufacture.

The plant tray may be termed a plant-growing tray, or a plant-propagating tray.

The rim may be termed a boss.

Each cell may comprise a base, through which the drain hole is defined. Alternatively, the side wall may extend to the edge of the drain hole in the bottom of the cell.

The drain hole is defined in a lower portion of the cell, so that water may drain out of the cell through the drain hole. The drain hole may be defined in the bottom of the cell, or in a base of the cell.

The use of a rim, or boss, around the drain hole may advantageously strengthen and reinforce the bottom of the cell, and may provide a strong and stable surface against which a mould ejector may push to eject the tray from a mould.

The rim or boss may also provide a strengthened cell which improves the robustness of the cell during day-to-day use. For example, in order to remove plants from cells for transplanting, typical automated systems may push the substrate "plug" upwards out of the cell using a plant ejector pin which is inserted through the drain hole. Conventional cell bases may be easily damaged by the plant ejector pins if the trays are misaligned with the pin, so that the pin misses the drain hole and pushes on the cell wall or base. The rim or boss may advantageously strengthen the base to prevent this and avoid damage to the edge of the drain hole, and may act as a guide for the plant ejector pin. The rim may also provide a fixed point to assist with alignment of the plant tray on a transplanting system.

If the plant tray is configured to rest on the cell bases when the tray is placed on a flat surface, the rim, or boss, may advantageously strengthen the base, and make cell base stronger and more impact-resistant during use.

Preferably the plant tray is a re-usable plant tray, which may be formed from injection moulded plastic and intended to have a usable life of many years and many growing cycles. By strengthening the cell bases and reducing the likelihood of breakage, the lifetime of these trays may advantageously be preserved or increased.

The strengthened cell base may be particularly advantageous where the cell side wall and/or base is formed from thin material, such as thin plastic.

In order to decrease the weight and manufacturing cost of plant trays, it is desirable to form the trays from as little plastic as possible. In the interests of making the trays lightweight, decreasing the thickness of cell side walls has long been thought desirable. However, the thickness of the cell walls is directly linked to the strength of the cells. When cell walls are made too thin, the cells, in particular the cell bases and/or drain holes, do not form properly during the injection moulding process, and are susceptible to breakage. Manufacturers therefore tend to decrease the thickness of cell walls to a minimum level at which the cells are thought to have acceptable strength. If the cells are found to be too fragile, cell walls are typically thickened to add strength.

The present invention has been found to provide improved cell strength and robustness by adding an additional rim or boss around the drain hole, rather than by increasing the thickness of cell walls. By redistributing the plastic used to form the tray and adding a thickened rim around the drain hole on the underside of the tray, the fragility of the drain hole can be greatly reduced, without adding much weight to the plant tray.

The rim or boss has a thickness greater than a thickness of the side wall. In this context, the thickness of the side wall refers to the cross-sectional distance through the side wall in a direction normal to the surface of the side wall. The thickness of the rim may be measured as the cross-sectional distance through the rim in a plane perpendicular to the axis of the cell. For example, where the cell is oriented upright, with its central axis of rotation oriented vertically through the drain hole, the plane perpendicular to the axis of the cell is in the horizontal plane. In this orientation, the thickness of the rim or boss may be defined as the cross-sectional thickness of the rim taken in a horizontal direction.

Preferably the thickness of the rim is at least 1.5 times, or 2 times, or 3 times, or 4 times, or 5 times greater than a thickness of the side wall.

The rim or boss may have a height defined as the distance from which the rim protrudes from the cell side wall. With the cell in an upright orientation, as described above, the height of the rim may be measured as the vertical distance between the point on the side wall where it connects to the rim, and the lowest portion of the rim.

Preferably the height of the rim is at least 1.5 times, or 2 times, or 3 times, or 4 times, or 5 times greater than a thickness of the side wall.

The rim is preferably configured to encircle the drain hole, such that the rim defines a drain passage having a length greater than the thickness of the side wall. The rim may be formed so that a surface of the rim is aligned with the edge of the train hole, so that the thickness of the side wall or base around the drain hole combines with the height of the rim to form a drain passage.

Positioning a rim on the underside of the cell may additionally improve the injection moulding process used to form the plant tray.

During injection moulding, plastic is injected into the top of the tray mould in hot liquid form. The liquid plastic then flows down through the mould to fill voids and cools to form the tray. As the liquid plastic flows through the mould it has to force air out of the voids in the mould, and a common problem is the occurrence of "short shots", which are areas around the bottom of the cells where plastic does not flow and fill out the base area. This results in holes and weak areas in the lower parts of cells. Providing a locally thickened rim or boss around the drain hole on the bottom of the cell plastic solves this problem, as plastic flows more easily to fill out the thickened rim in the bottom of the mould, so that the side wall or base of the cells is formed without short shots.

The rim is preferably abuttable against a mould ejector pin for ejecting the tray from a mould during manufacturing. By reinforcing the bottom of the cell the rim may advantageously decrease the likelihood of damage to the cell base when ejecting the tray from a mould.

Preferably a portion of the side wall slopes downwards to an edge of the drain hole, and the rim comprises a flat bottom surface parallel with the tray top, so that the rim is configured to provide a flat surface area on the underside of the cell.

In a preferred embodiment the drain hole is formed in the centre of the cell base, and the cell base slopes downwards towards the central drain hole, so that the drain hole is defined in the lowest portion of the base.

The flat surface area may be particularly suitable for abutting with a mould ejector pin during manufacture. The provision of a rim, or boss, around the drain hole may be particularly beneficial when the cell base is sloped, or inclined, or tapered, between the drain hole and the side wall, as without this rim the cell base may be relatively weak. As such a tapered or inclined base provides very little surface area against which a mould ejector pin may push, for example, the base may be susceptible to breaking or deforming when ejected from the mould during manufacture.

Preferably each cell of the plant tray comprises a rim, or boss, arranged around the drain hole on the underside of the cell base.

Preferably the rim, or boss, is formed as a continuous ring encircling the drain hole.

Originally the cell base on injection molded plastic vegetable propagation trays had a flat base with a round hole in the center (see FIGS. 1a and 1b) and effectively created a ledge around this hole which stopped roots being forced out of the hole in the most effective way. The design was then evolved to have the tapered wall close in and terminate at the point of the hole as per FIG. 1c and this has improved drainage and air pruning of roots but has led to the base area of the cell being quite weak and easy to break.

In order to strengthen the base of the cell but not deteriorate from the quality of drainage and air pruning we have designed an external boss around the base hole as per FIG. 4a. This has strengthened the base area considerably and solved the problem we had experienced.

Additionally, this boss has a locally thickened area which creates the strength but also allows us to overcome another problem i.e. filling of the cell with plastic at the manufacturing stage. When plastic is injected into the mold in a liquid hot form it flows down the cell and cools slowly plus has to force air out of the mold and it is a very common problem to have short shots i.e. areas around the base of the cell where plastic does not flow and fill out the base area. This results in holes and weak areas. With the locally thickened area at the base of the cell this no longer happens and it is much easier to avoid this problem as the plastic flows a lot easier through the thick section.

Additionally, this feature gives another benefit in that it creates a locally thickened base area around the bottom of the cell which can be used to eject the tray off the mold at the end of the production process. Typically this is done using ejector pins and these ejector pins can be a lot bigger, stronger and more effective with this increased area of plastic, see FIG. 5.

Number of Vertical Ribs

Plants are not intended to be grown in containers and as described earlier roots will circle in a container producing a poor quality root system. Vertical root training ribs have been used to stop root circling and these are partly effective in this respect. Root circling can be defined as any root that circles within the cell more than 20% of the circumference of the cell or 72 degrees.

Typically in the past, four vertical ribs as a maximum have been used which represent 25% of the circumference or 90 degrees of rotation and are thus allowing roots to circle more than the desired amount.

Adding any type of rib effects plastic flow adversely in the cell as it stops a uniform fill and everything needs to be balanced carefully which takes a lot more time and attention to detail in making the mold.

Ribs are notorious at getting stuck on the mold when the part is ejected and having big ribs makes this worse and having a lot of ribs or double ribs makes it extremely more difficult to eject from the mold. What happens is that the plastic grabs the ribs as it cools and then hangs on so the more area there is the worse this is. To overcome this problem and allow for the making of the big ribs etc. we have to a) machine with better tolerances b) add radius's which is difficult and expensive, and c) polish the metal after cutting, which is a lot more which is labor intensive and expensive.

Thus, a cell having a large number of vertical ribs has not been done before, at least in part, because it makes production a lot harder as described above and plastics molders do not understand plants and the benefit of not allowing the roots to circle much.

It is very difficult to increase the number of ribs above four, especially if the ribs are deep enough to stop roots circling effectively but we have developed the techniques noted above to allow us to do this and if six ribs are added then this represents 17% of the circumference or 60 degrees. Eight ribs will represent 12.5% of the circumference or 45 degrees and twelve ribs will represent 8% of the circumference or 30 degrees. All of these examples will reduce the amount of root circling to an acceptable level, i.e., less than 20% of the circumference.

The enclosed FIG. 6 demonstrates the designs using 8 ribs.

Vents

Growing vegetable transplants in multi-cell trays in greenhouses is a balance between plant quality and plant spacing. If you increase plant density i.e. the number of plants per tray you make the plants cheaper but of poorer quality.

Nurseries and tray designers try to help get good plants at higher densities using a number of methods. One way of achieving this is to be able to dry the plants back regularly and then water them. This is known as dry wet cycles and the more dry wet cycles during the growth of a seedling the better the plant will be.

Helping the soil in the tray to dry off partly by the plant using more water through evaporation helps this process. One of the design features of the tray that helps this in turn is the use of a vent in the top surface of the tray which allows air to pass through the vent and up through the foliage of the plant creating more evaporation and in turn drying of the soil. An additional benefit of the vent is that it reduces humidity in the canopy and therefore the chance of disease and this is a very effective tool at higher densities.

Tray "Vents": The "Multiple Rib Chimney" aids with drainage and aeration of the cell, but further assistance can be provided to help aerate the densely growing plants above the cell. If the plants above are aerated, they dry off quicker, which in turn makes them use more water from the soil, which assists with the "dry wet cycle." A second embodiment of the design assists this process by providing "vent holes" in the upper tray surface between each cell. The benefit of injection molding the tray is that the "vent hole" can marry exactly the void between the cells. In this way a "cycle" of air can be drawn up through the base of the tray, past each individual cell wall, and through the upper tray surface past the growing plants. This effect maximizes the airflow past each cell, which in turn maximizes the promotion of the "dry wet cycle."

An additional benefit of the "vent hole" is that it reduces humidity below the tray, and therefore the chance of disease propagation, and is a very effective tool at higher cell densities in trays.

Vent holes have been employed previously in both "solid" EPS styrofoam trays, and also in thermoform plastic tray. But by the nature of their manufacturing process, vent holes tend to be circular and small in size. In the case of thermoform trays, this means that this still produces trapped and "stagnant" air against the cell wall. In the case of the EPS styrofoam tray, the tray is generally solid with narrow through holes, and so there is both a low volume of air passage, and at a distance from the cell so does not benefit in air passage close to the cell wall.

In this embodiment, the process of production of tray via injection molding means that the "vent hole," by closely following the profile between cells, is typically "square" or "polygonal" as opposed to circular.

An additional significant benefit of this type of "vent hole" promoting higher air flow is that where under bench heating is used the heat will rise up through the tray, warm the compost (as airflow can now pass the full cell wall), as it travels through and also heat the foliage above the tray and give an optimum temperature in this area at minimum heating cost. In the example of the EPS styrofoam tray, the foam actually acts as an insulator, therefore coupled with poor aeration actually requires greater heating at a greater cost.

Vents have been used previously in EPS Styrofoam trays but as it is a block material the vent tends to be very narrow throughout the full depth of the tray and therefore the chimney that is created below the hole or the vent in the top surface of the tray is very poor at passing a large volume of air up through the tray.

Some thermoform plastic trays also use vents in the top surface of the tray and are much more effective as the opening underneath the vent is much larger as it is a sheet material and not a block material and thus you get much more effective air movement through the vent. There is a limitation, however, on the size of the vent as it has to be cut after the manufacturing process and the hole needs to be minimized so it doesn't reduce the strength of the tray too much. The hole on the thermoformed tray also needs to be round as this is the only way to practically punch a hole in the top surface of the tray which limits the size of the hole.

With injection molding of high density plastic vegetable propagation trays it is possible to have a large opening underneath the vent i.e. the same as the thermoformed tray but the hole can also be much larger and of any shape required in order to maximize its size and therefore the amount of air flowing upwards through the vent, this typically means a square hole or vent shape.

Vent holes are difficult to manufacture accurately as they are in the horizontal plane and are formed where the male and female parts of the mold touch. It is very easy for the two metal parts to not quite touch in which case the vent hole is closed over with plastic. In order to help make a good clean open vent hole we have now made the shutoff area angled by making a dome type of intersection which makes for better shut off between the two halves and if any plastic does still form between the two parts it sticks up above the tray and can be easily sliced off after it comes out of the mold.

This type of hole as shown in FIG. 7a is the most effective way of getting a large volume of air through the vent and additionally has the benefit that will allow excess water to fall down through the hole more effectively than any other type of vent. Additionally, this hole despite its size does not reduce the strength of the tray or the life of the tray.

In a third aspect, the invention provides a plant tray for containing a substrate for propagating plants, in which the tray comprises a tray top and an array of cells, each cell comprising a cell opening formed in the tray top through which substrate may be placed in the cell, in which the cell openings are octagonal in shape, and in which the tray top comprises a plurality of vents arranged between the cells and configured to allow air to flow through the tray top.

Preferably the cells are arranged in a regular array, particularly preferably a rectangular array, in which the cells are evenly spaced in an array of parallel rows.

Preferably the vents are square, or polygonal, in shape, and are positioned between four cell openings in the tray top. This may be an advantageously space-efficient arrangement for combination with octagonal cell openings, and may provide for good airflow past cell walls and cell openings.

Compared to a similar array of conventional, square, cells in a tray of the same size, the octagonal cell openings have a smaller area than the square cell openings of the prior art. In the prior art, reducing the area of the cell opening was considered to be detrimental to the plant tray, as it reduces cell volume, makes the cells harder to fill with substrate, and decreases the "usable" proportion of the tray top which is occupied by cell openings.

By reducing the surface area of the cell opening there is more space left for making a bigger vent. The bigger the vent, the better the air flow and thus this octagonal shape allows for much better ventilation compared to known plant trays.

In a preferred embodiment, the cells may comprise an octagonal cross-section over a portion of the cell height.

Preferably, the cells may comprise an octagonal cross-section over an upper, or proximal, portion of the cell proximal the tray top, and a non-octagonal cross-section over a lower, or distal, portion of the cell.

Preferably the cells comprise a square cross-section over a lower, or distal, portion of the cell.

Particularly preferably, the cells may comprise an octagonal cross-section over an upper portion of the cell, such as the top 40%, or 50%, or 60%, or 70%, or 80%, or 85% of the cell height. The cells may comprise a non-octagonal cross-section over a lower portion of the cell, such as the bottom 60%, or 50%, or 40%, or 30%, or 20%, or 15% of the cell height.

By providing the cells with at least two different cross-sectional shapes over their length, or height, the cell may configured to control the distribution of the cell volume for containing substrate.

In a preferred embodiment, the cell may comprise an upper portion of the side wall having a first draft angle (the draft angle being the angle of the inclined side wall to vertical), and a lower portion of the side wall having a second draft angle greater than the first draft angle.

In a conventional cell with a constant draft angle, the narrowed cell base means that the majority of substrate is contained in the wider upper-half of the cell. By providing at least two different cross-sectional shapes, and/or by providing two different draft angles, over the height of the cells however, this volume distribution may be altered, so that a greater proportion of substrate is contained in the lower-half of the cell, in use.

Preferably the cells may be configured so that at least 23%, or 25%, or 28%, or 30%, or 35%, or 40% of the cell volume is distributed in the bottom 50% of the cell height. The cell height may be defined as the distance from the cell opening to the drain hole along the central axis of the cell. The cell volume may be defined as the internal volume of the cell defined between the cell opening, the inclined side wall, and the drain hole.

This may advantageously provide improved substrate distribution, in use, as this provides more space for plant roots to develop in the lower half of the cells, where they are most needed after transplanting. This volume distribution may also allow water to be retained in the root ball (substrate and roots) for a longer period after the plant is transplanted, encouraging healthy growth.

This cell arrangement may further compensate for the reduced area of the octagonal cell openings, and allow the volume of the cell to be made equivalent to the volume of conventional square cells. This may be particularly advantageous for integration into existing automated cell-filling systems.

Additionally this vent is created by reducing the area of the top of the cell by making it octagonal instead of square and this reduces the cell volume in the top half of the cell. We add this volume back in the bottom of the cell but the result is good in that there is a higher proportion of cell volume in the bottom half the cell which is very good as that is where the roots develop after transplanting into the field and also allows water to be retained in the cell longer after transplanting as the roots are deeper in the soil.

An additional significant benefit of this type of vent with the higher air flow is that where under bench heating is used the heat will rise up through the tray, warm the compost as it travels through and also heat the foliage above the tray and give an optimum temperature in this area at minimum price for heating. With EPS Styrofoam trays for example, a lot more heat is required as the material is insulative and the vents if present in the tray are fairly ineffective and as a minimum canopy temperature within the leaves is required, more heat has to be used.

Preferably the plant tray may have a cell density of greater than 500 plants per square metre, or greater than 750, or 1000, or 1250, or 1500 plants per square metre.

Rim-Around-Vents

In a fourth aspect, the invention provides a plant tray for containing a substrate for propagating plants, in which the tray comprises a tray top and an array of cells, each cell comprising a cell opening formed in the tray top through which substrate may be placed in the cell, in which the tray top comprises a plurality of vents arranged between the cells and configured to allow air to flow through the tray top, and in which the tray comprises a plurality of vent rims arranged around the circumference of the vents, the vent rims being configured to project downwards from the tray top. While it is desirable to provide vents for improved airflow, the size and number of vents that it is possible to provide in plant trays has traditionally been limited by the strength of the tray. Removing material from the tray top by forming vents typically has the side effect of reducing the strength of the tray, which is undesirable, especially as plant trays are intended to be filled, in use, with a large amount of soil and plants, which may weigh a substantial amount when watered. The strength of a plant tray is therefore very important, as it must be possible to pick up and move a filled tray without the tray breaking or buckling under the weight of its contents.

The provision of vent rims arranged around the vents in the tray top may advantageously strengthen the plant tray. This may make it possible to provide a greater number of vents, and/or larger vents, in the plant tray while maintaining an acceptable strength.

The vent rims may be provided as downturned rims which project below the bottom surface of the tray top.

The top surface of the tray top is defined as the uppermost surface when the plant tray is upright, so that substrate may be placed in the cells. The tray top is preferably a flat tray top having a bottom surface opposite its top surface.

Preferably the vent rims project downwards from the tray top by a rim height which is at least 1.5 times, or 2 times, or 3 times, or 4 times, or 5 times greater than a thickness of the tray top.

The vent rims may project downwards from the tray top at an angle of 90 degrees.

Preferably the vent rims project downwards from the tray top at an angle not equal to 90 degrees. Particularly preferably the vent rims are configured to be angled from the tray top towards the centre of the vent. For example, the vent rims may project downwards from the tray vent at an angle of 85 degrees (draft angle 5 degrees), or 80 degrees (draft angle 10 degrees), or 75 degrees (draft angle 15 degrees) from the plane of the tray top.

A typical problem found when injection-moulding plastic plant trays with vents is known as "feather flash". This occurs at the vent location when the male and female moulds are not precisely flush with one another, resulting in leakage of plastic into the vent location between the moulds. This creates an undesired thin plastic layer which can obscure the intended vent. This undesired layer is known as "feather flash".

According to the present invention, vent rims may be formed to strengthen the tray top, and feather flash may also be reduced or avoided altogether, by altering the shape of the male and female moulds used for injection moulding. In order to help mould a reliable vent the vent and vent rim may be formed using moulds with an angled shutoff area. An angled shutoff are may be created by a dome type of intersection between the male and female moulds. The angled shutoff area may be created by male mould projecting through the vent, and through the plane of the tray top, during injection-moulding. This enables better shut off between the two mould halves, decreasing the likelihood of feather flash forming across the vents. If any feather flash does still form between the two mould halves, however, this arrangement ensures that it will protrude below the tray top, and does not form over the whole vent. Any feather flash is thus formed on the edges of the vent rims, in a position that does not obstruct air flow through the vent.

Features described above in relation to one aspect of the invention are equally applicable to and combinable with features described in relation to another aspect of the invention.

DESCRIPTION OF SPECIFIC EMBODIMENTS AND BEST MODE OF THE INVENTION

Specific embodiments of the invention will be now be described by way of example, with reference to the accompanying drawings in which:

FIG. 1b is a partial cutaway view of the base of the plant container of FIG. 1a;

FIG. 4b is a partial vertical cross-section of the cell shown in FIG. 4a;

Figure 7A:
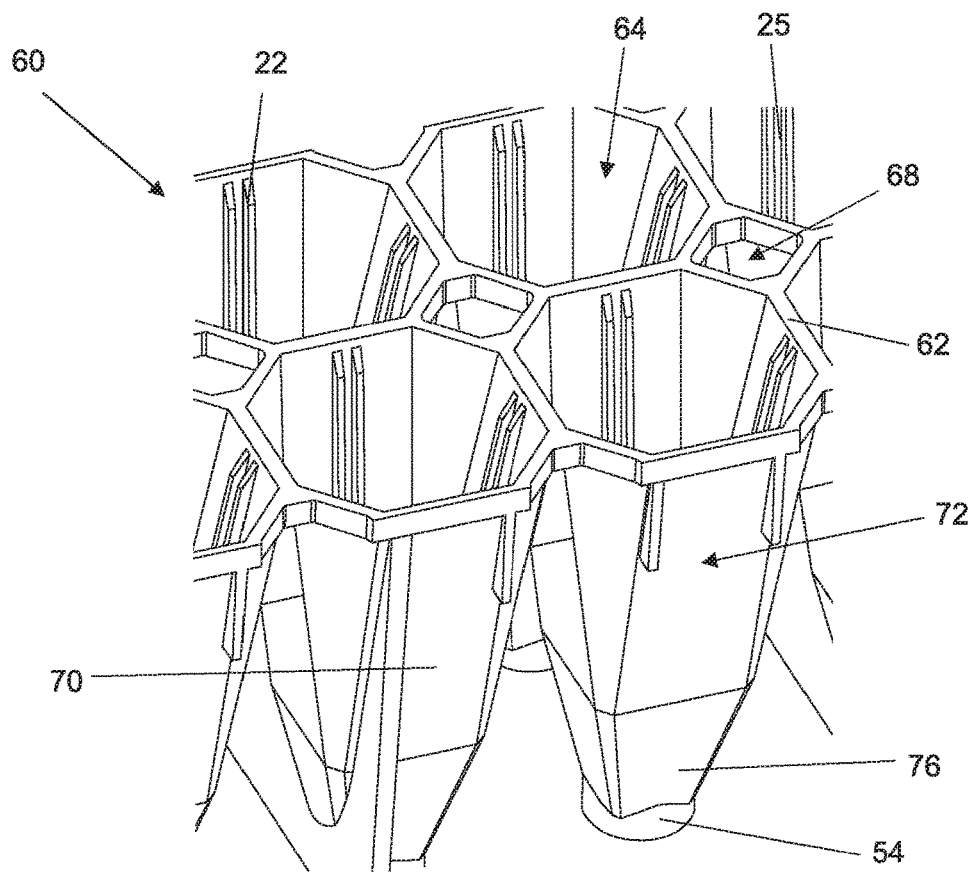
Figure 7B:
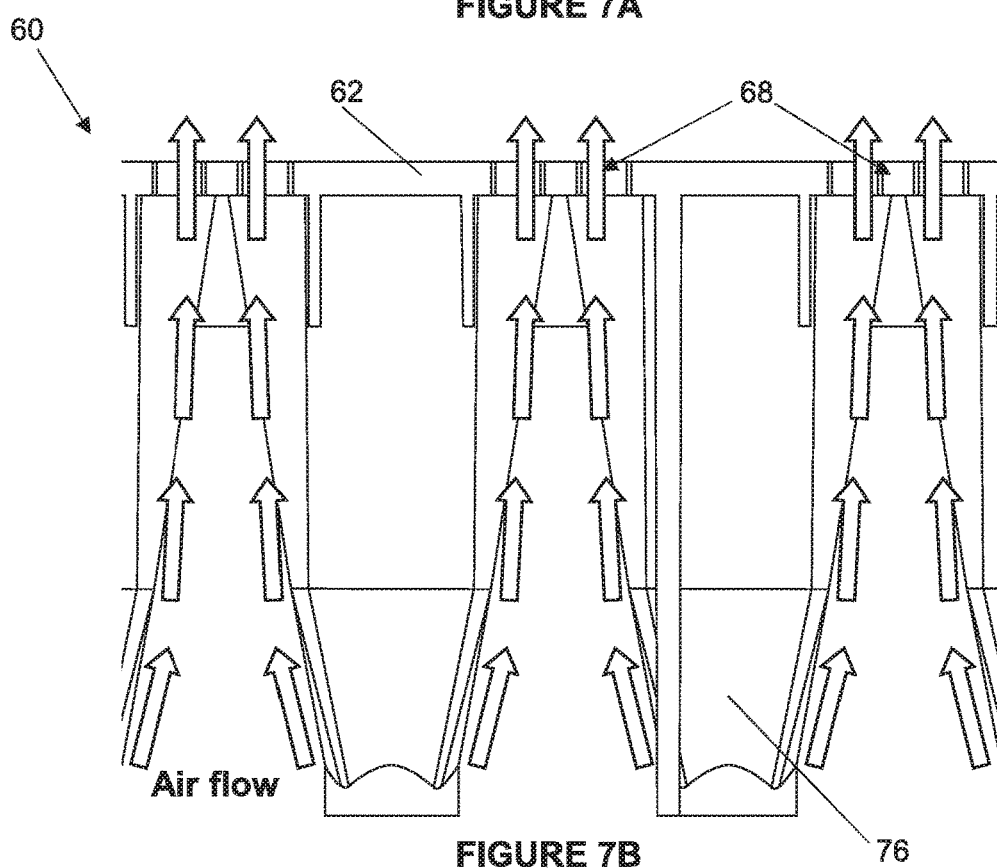
Figure 7C:
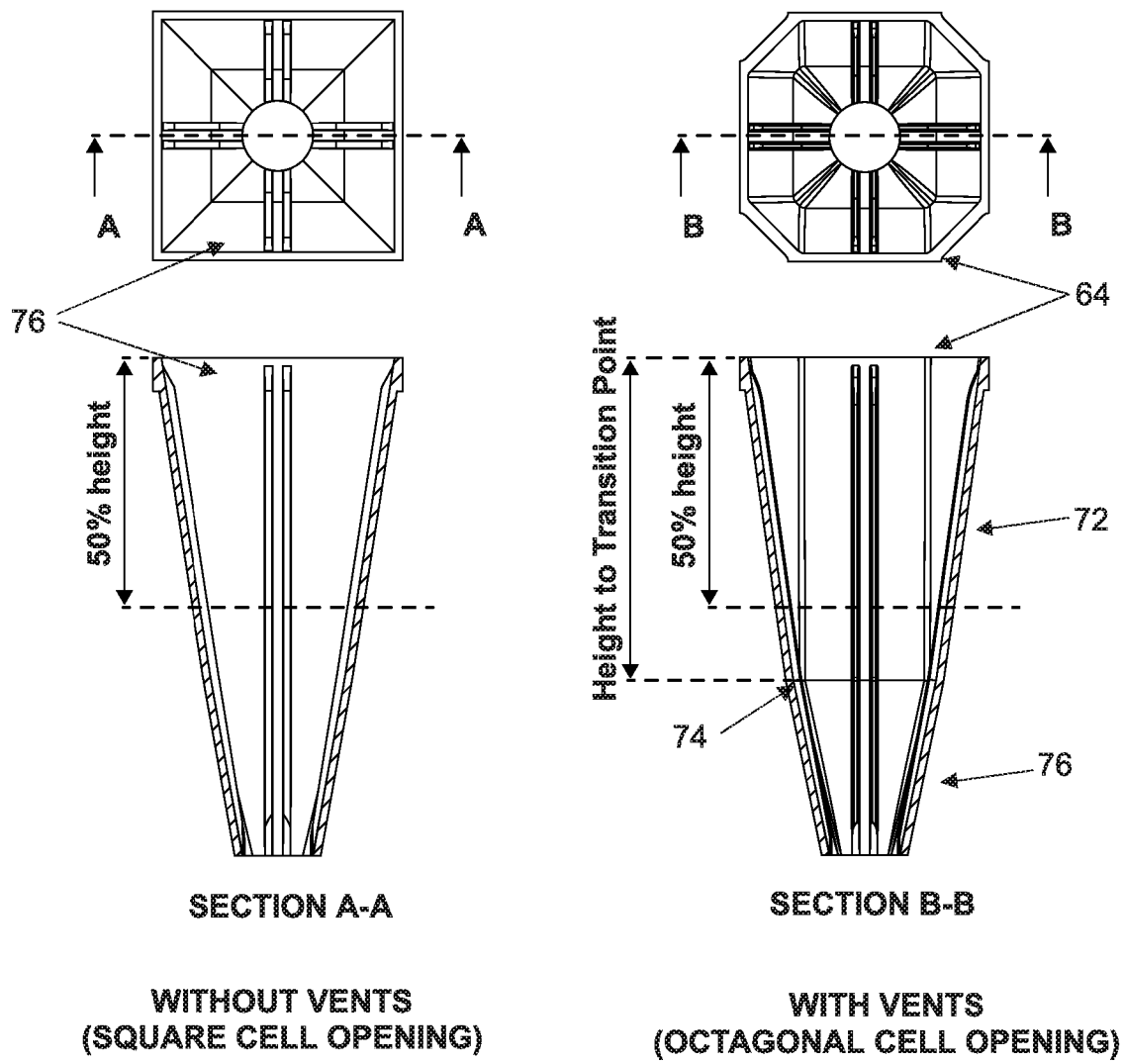
Figure 8A:
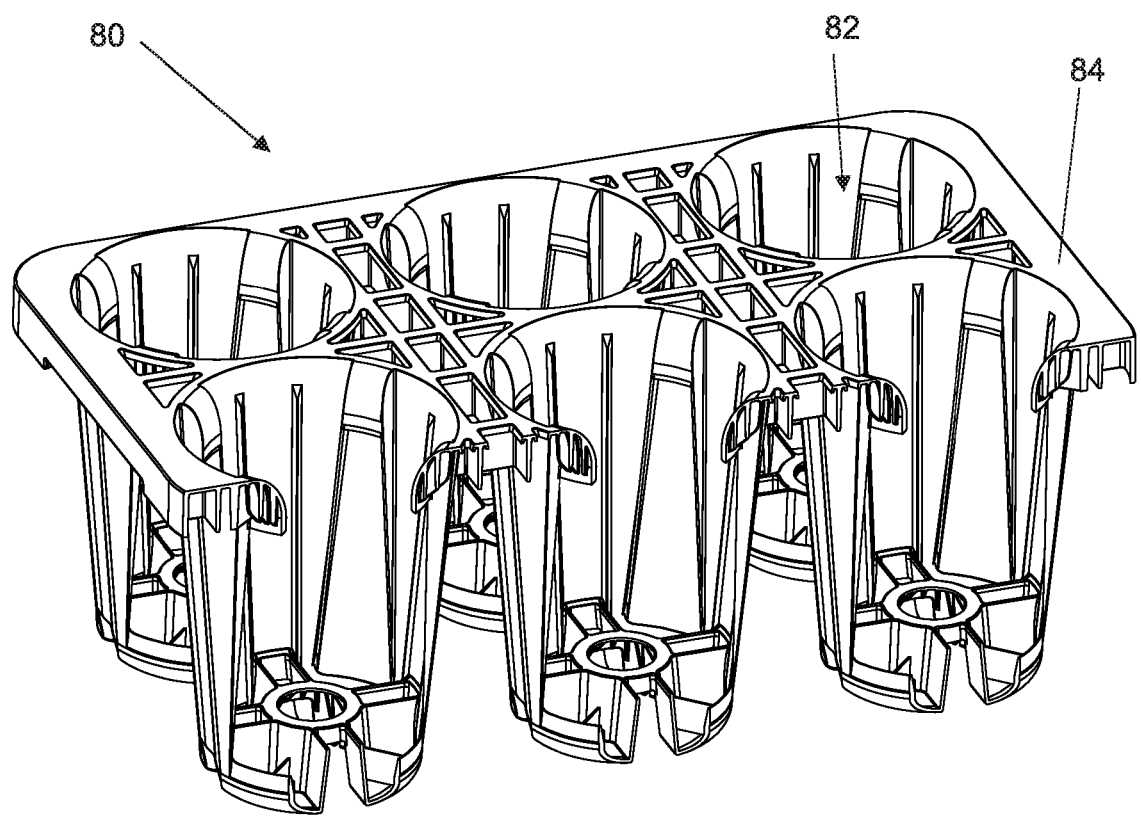
Figure 8B:
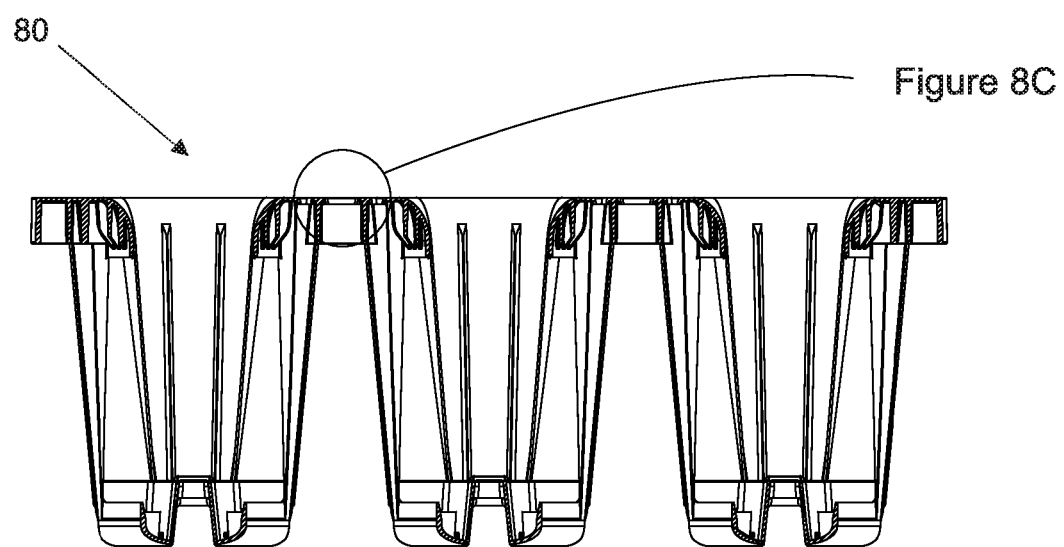
Figure 8C:
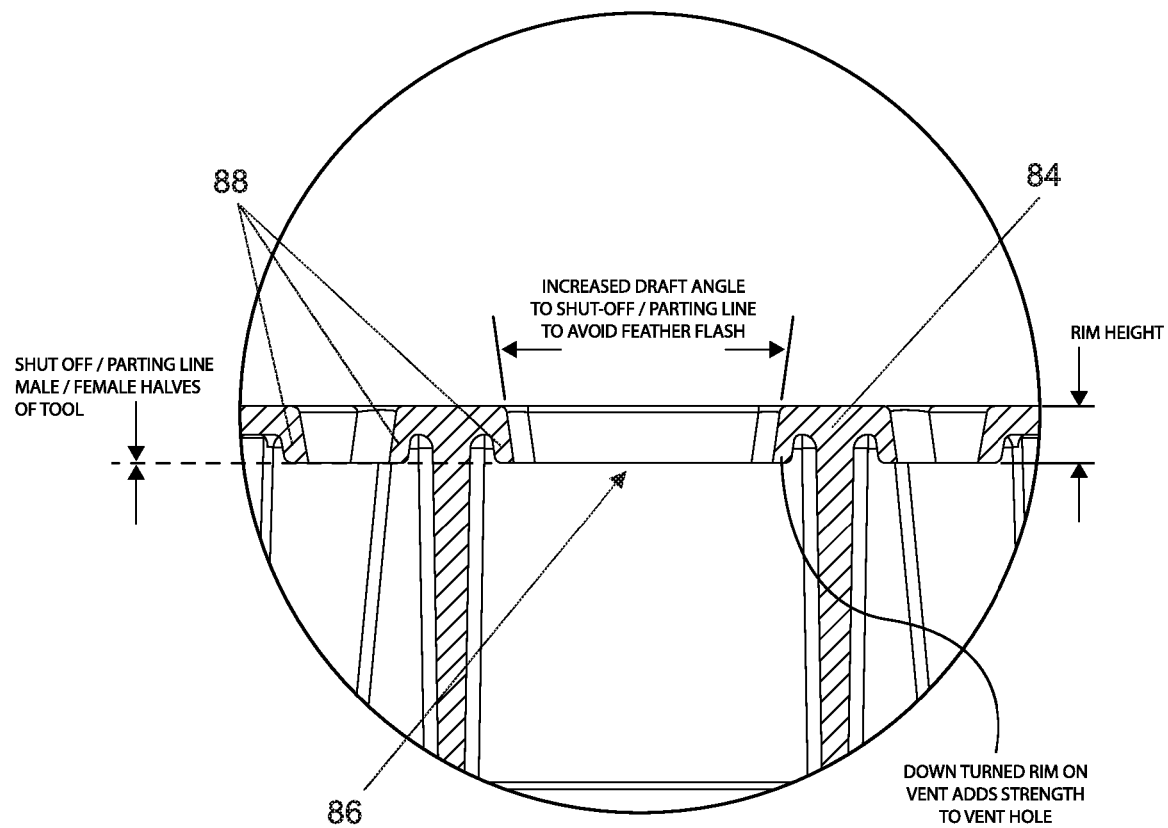

FIG. 7*a* shows a perspective view of a section of plant tray according to a preferred embodiment of the present invention;

FIG. 7*b* shows a vertical cross-section of the plant tray shown in FIG. 7*a*;

FIG. 7*c* is a comparative illustration of a prior art square cell and an octagonal-top cell according to a preferred embodiment of the present invention;

FIG. 8*a* is a cutaway perspective view of a plant tray according to a preferred embodiment of the present invention;

FIG. 8*b* is a cutaway side-on view of the plant tray of FIG. 8*a*;

FIG. 8*c* is an enlarged cross-sectional view of a portion of the plant tray of FIGS. 8*a* and 8*b*.

Figure 1A:
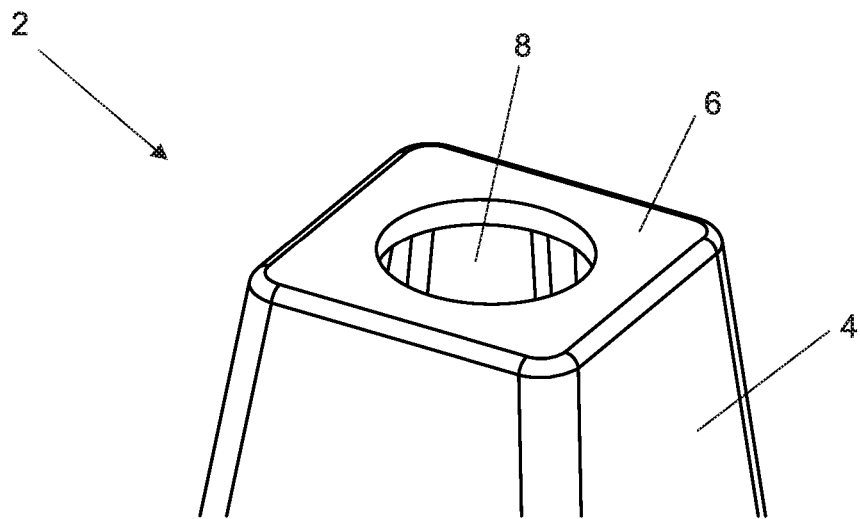
FIG. 1a is a partial perspective view of the base of a first plant container according to the prior art.
Figure 1B:
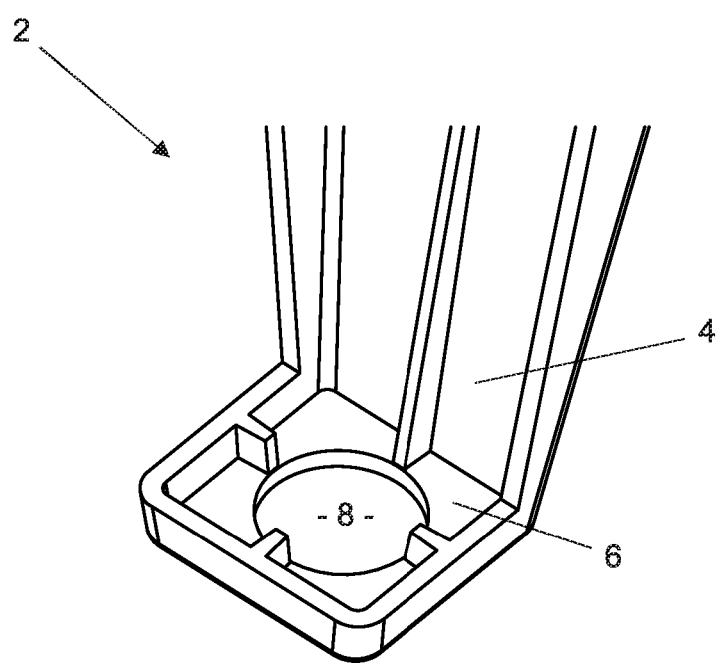

FIGS. 1*a* and 1*b* show a prior art plant container 2 having an inclined side wall 4, and a flat base 6 with a round drain hole 8 in the centre of the base. In this arrangement, the flat base 6 effectively creates a ledge around the drain hole 8, which stops roots from growing towards the drain hole in an effective way and creates undesirable root circling.

Figure 1C:
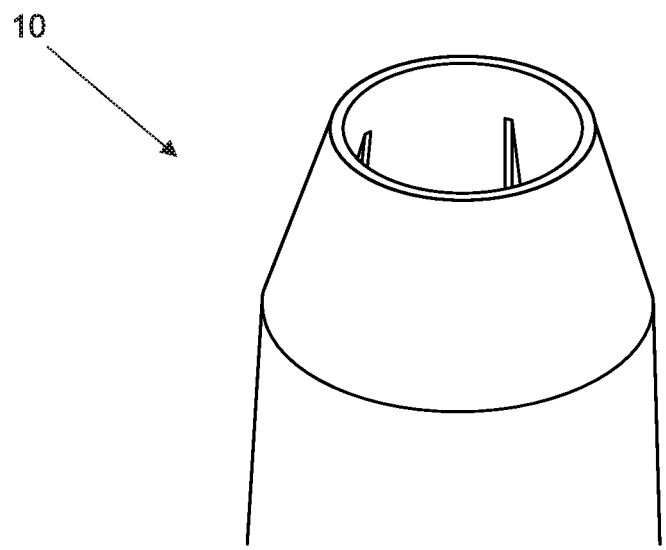
FIG. 1c is a partial perspective view of the base of a second plant container according to the prior art.

Later container designs, such as plant container 10 evolved to have the side wall close in and terminate at the point of the drain hole as shown in FIG. 1*c*. This has improved drainage and air pruning of roots but has led to the base area of the cell being quite weak and easy to break.

Figure 2A:
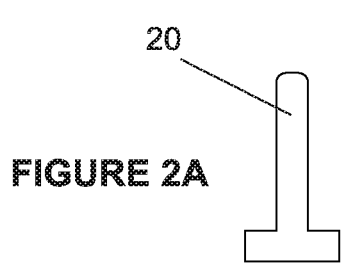
FIG. 2a is a partial horizontal cross-section of a single rib according to the prior art.

FIG. 2*a* is a partial horizontal cross-section of a single root-training rib 20 according to the prior art, similar to the root-training ribs shown on the side walls of the containers in FIGS. 1*a*-1*c*.

Figure 2B:
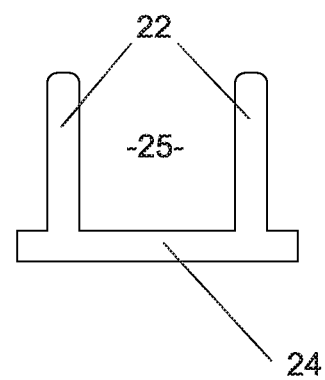
FIG. 2b is a partial horizontal cross-section of a set of two parallel ribs according to a preferred embodiment of the present invention.

FIG. 2*b* is a partial horizontal cross-section of a set of two parallel ribs 22 joined by a section of container side wall 24. Parallel ribs 22 form a U-shaped channel 25 with side wall 24. As the ribs are formed on the inside of the container side wall 24, facing into the container, the parallel ribs form a channel through which air may flow when the container contains a substrate.

The separation of the parallel ribs 22, and the height of the ribs 22, are chosen so that substrate particles in the container do not enter the U-shaped channel 25 and block airflow through the channel.

Figure 2C:
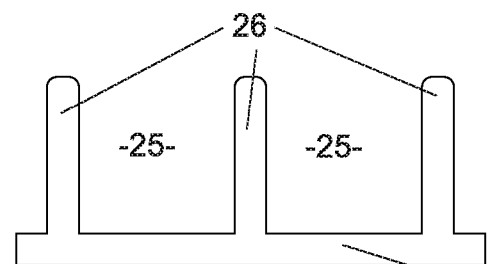
FIG. 2c is a partial horizontal cross-section of a set of three parallel ribs according to a preferred embodiment of the present invention.

FIG. 2*c* shows a set of three parallel ribs 26 joined by a section of container side wall 24. The three ribs form two parallel U-shaped channels 25 through which air may flow in use.

Figure 2D:
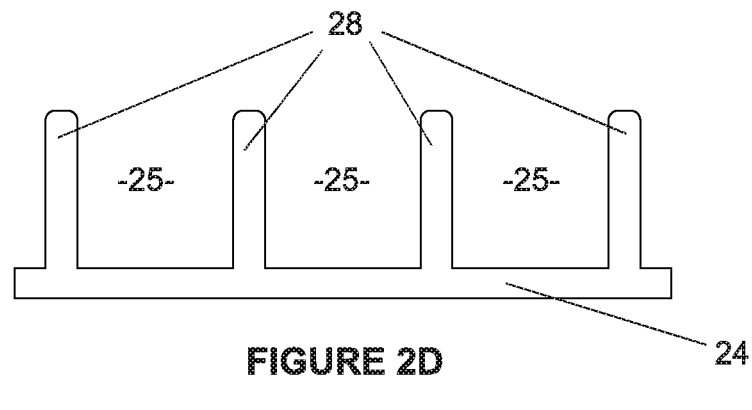
FIG. 2d is a partial horizontal cross-section of a set of four parallel ribs according to a preferred embodiment of the present invention.

FIG. 2*d* shows a set of four parallel ribs 28 joined by a section of container side wall 24. The four ribs form three parallel U-shaped channels 25 through which air may flow in use.

Figure 2E:
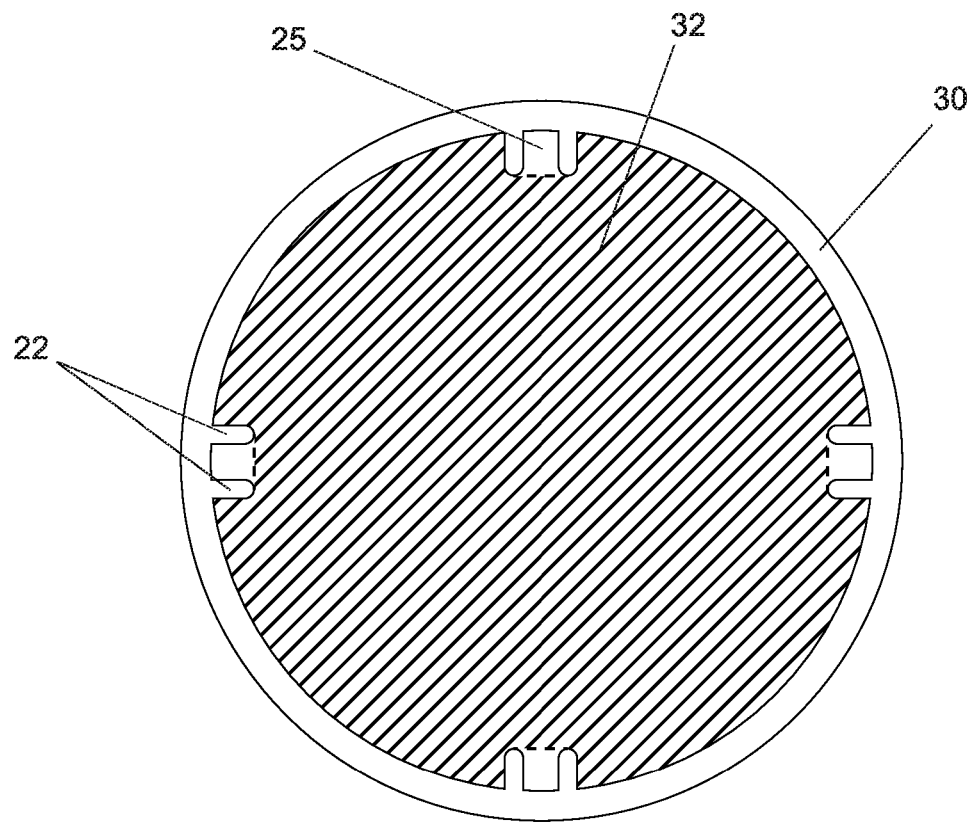
FIG. 2e is a horizontal cross-section of a plant container comprising four sets of two parallel ribs according to a preferred embodiment of the present invention.

FIG. 2*e* is a schematic horizontal cross-section of a plant container 30 with a circular cross-section, comprising four sets of two parallel ribs 22 arranged around the circumference of the container. In use, the container is filled with a substrate 32 (which may be soil) with a mean particle size greater than the separation of the set of parallel ribs 22. Thus, as shown in FIG. 2*e* the substrate fills the container 30, but does not fill the channels 25 between the ribs 22. Air may thus flow along the channels 25 when the container is full of substrate, allowing aeration of the substrate during plant growth. The channels 25 may also provide improved drainage of excess water from the substrate, as excess water may flow into the channels and downwards towards the drain hole in the bottom of the container.

Figure 2F:
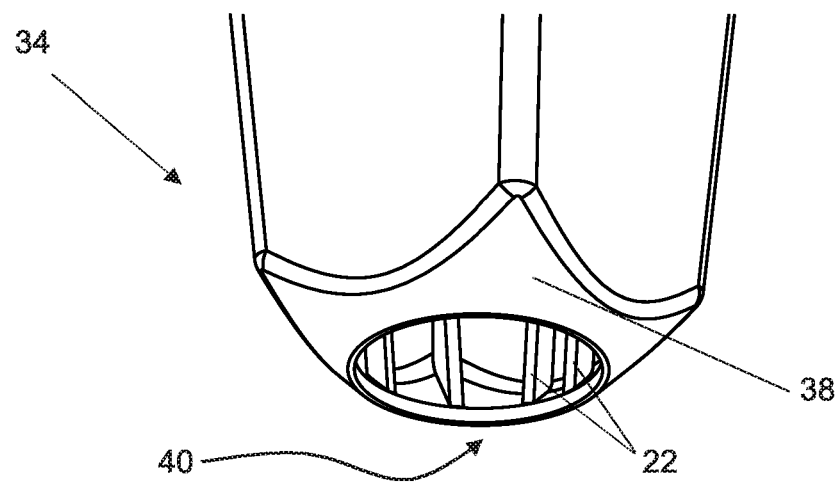
FIG. 2f is a partial perspective view, from below, of a plant container according to an embodiment of the present invention.

FIG. 2*f* is a partial perspective view, from below, of a cell 34 of a plant tray (not shown). The cell 34 has a square cross section with a four-sided inclined side wall 36 and a base 38 which slopes down to a circular drain hole 40 in the centre of the base. A set (or pair) of two parallel ribs 22 is arranged on each of the four sides of the side wall 36, and oriented to extend from the edge of the drain hole 40 to an upper section of the side wall 36. Each set of parallel ribs has a height of 3 mm and a lateral separation of 3 mm between the ribs. This makes the cell 34 particularly suitable for use with substrates with mean particle sizes greater than 3 mm, preferably greater than 5 mm, as the particle sizes mean that particles will not fill in the channels 25.

Figure 3A:
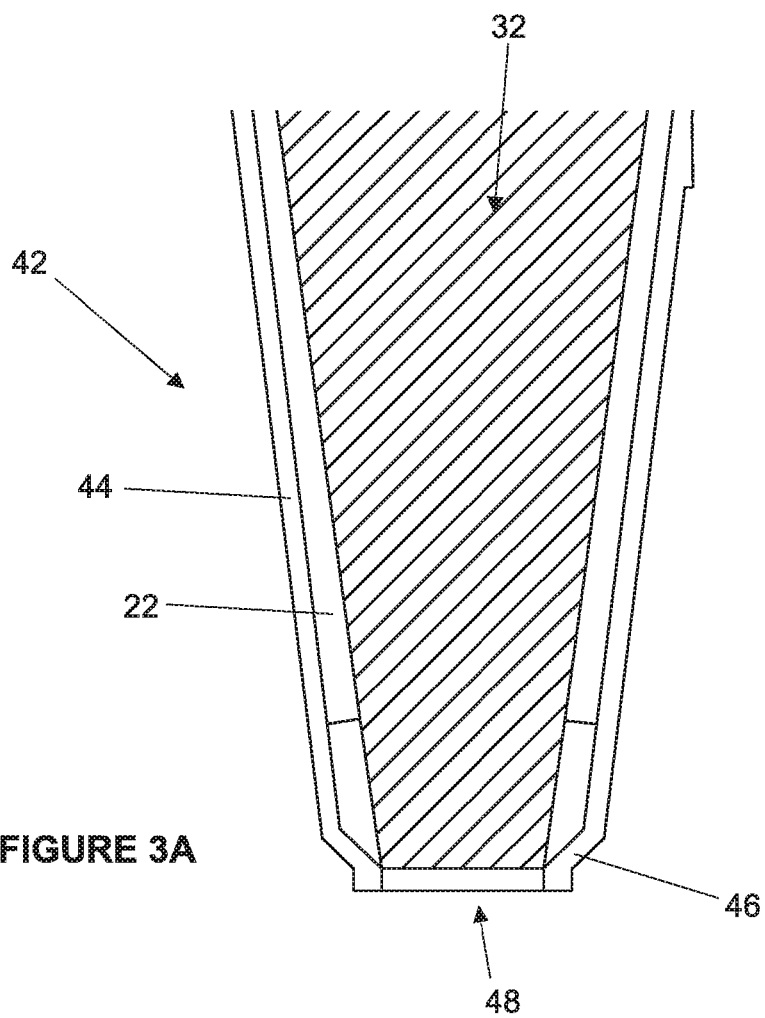
FIGS. 3a, 3b and 3c are partial vertical cross-sections of a plant container showing ribs according to a preferred embodiment of the present invention.

FIG. 3*a* shows a cross-section of a cell 42 of a plant tray, taken through two channels 25 on opposing sides of the cell. The cell has an inclined side wall 44 and a base 46 which slopes downwards to a central drain hole 48 in the bottom of the cell. Similarly to the cell of FIG. 2*f*, the cell comprises four sets of parallel ribs 22 arranged around the circumference of the cell. The ribs 22 project from the side wall 44 into the container, and extend from the base 46 to an upper section of the cell.

In FIG. 3*a*, as in FIG. 2*f*, the ribs 22 are configured to terminate against the base 46 of the cell close to the edge of the drain hole 48. When the container 42 is filled with substrate 32, as shown in FIG. 3*a*, substrate therefore abuts the ribs 22 and fills the cell all the way to the drain hole. This means that the base-ends of the channels 25 may become blocked in use by substrate, so that no airflow between the channel 25 and drain hole is possible.

Figure 3B:
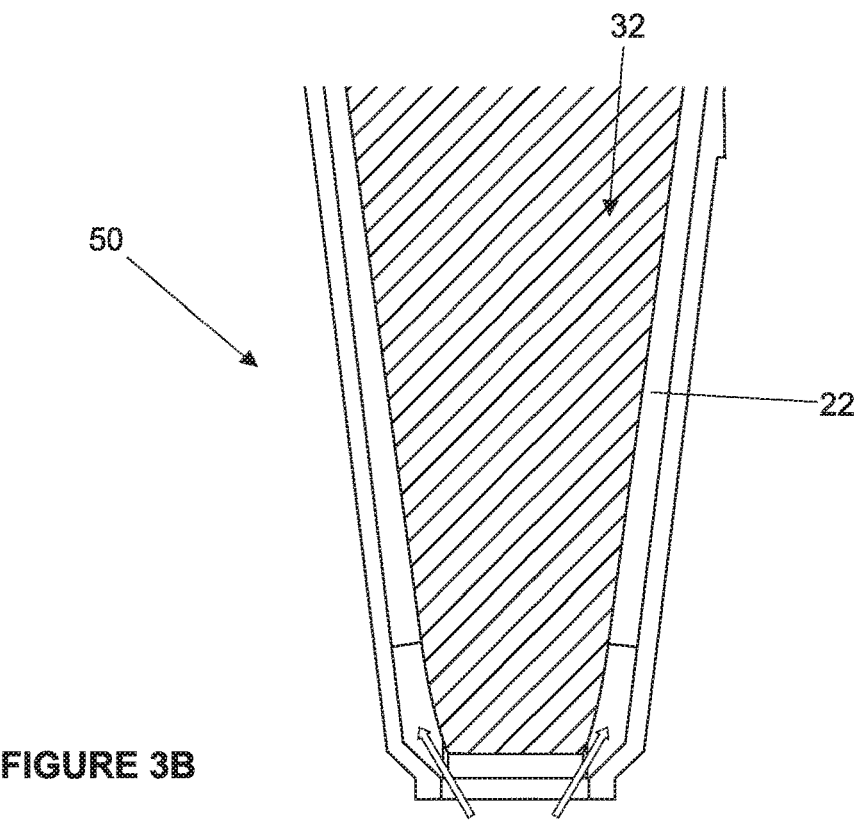

FIG. 3*b* shows a cell 50 which is a preferred variant on the cell of FIG. 3*a*. In cell 48, the sets of parallel ribs 22 are formed to extend over the side wall and along the base 46 of the cell to terminate at the edge of the drain hole 48. Unlike the ribs of FIG. 3*a*, however, the ribs of cell 48 do not taper in and terminate against the base. In cell 48 the ribs 22 are formed over the base so that the height of the ribs 22 when measured at the edge of the drain hole is approximately the same as the height of the ribs measured from the side wall higher up the cell. This arrangement means that when the container 50 is filled with substrate 32, as shown in FIG. 3*b*, the ribs 22 support the substrate above the plane of the drain hole, so that the lower ends of the channels 25 are not obstructed by substrate. Air may therefore flow from the channels 25 in or out of the drain hole when the cell is full of substrate, providing improved aeration and drainage of the substrate.

Figure 3C:
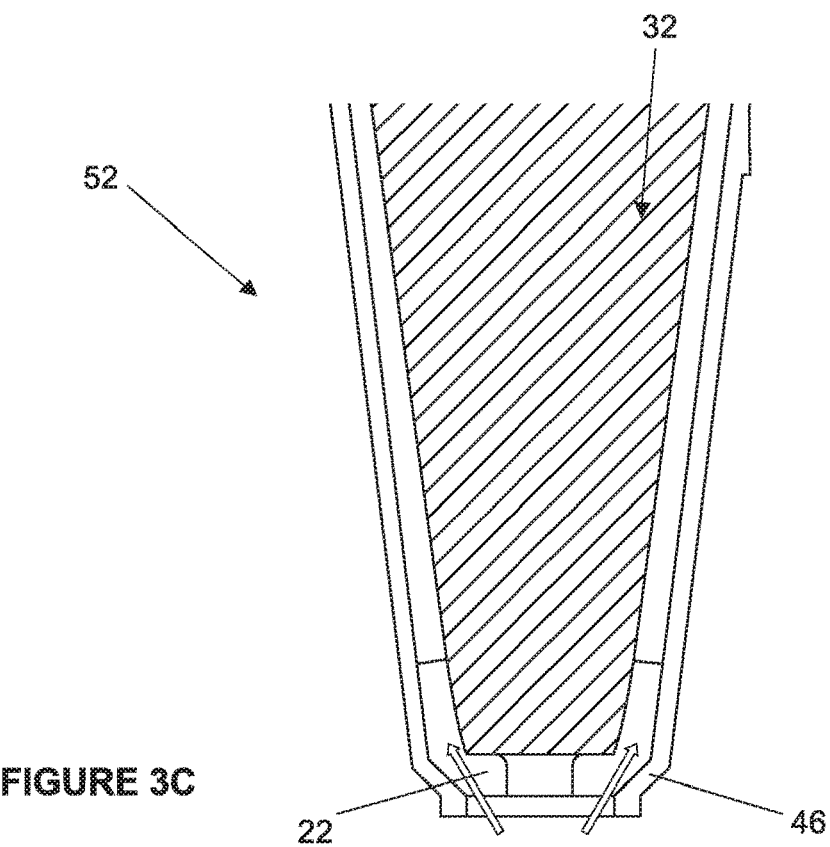

FIG. 3*c* illustrates an alternative embodiment of a cell 52 in which the ribs 22 are formed to extend from the cell base 46 across a portion of the drain hole 48. Thus, the channels 25 effectively extend outwards into the drain hole, so that substrate 32 is supported above the channels and the drain hole, and air may flow into and out of the channels 25 through the drain hole.

The cells of FIGS. 3*a*-3*c* are preferably suspended off the ground in use, for example on rails, to allow air flow to the drain holes of the cells.

Figure 4A:
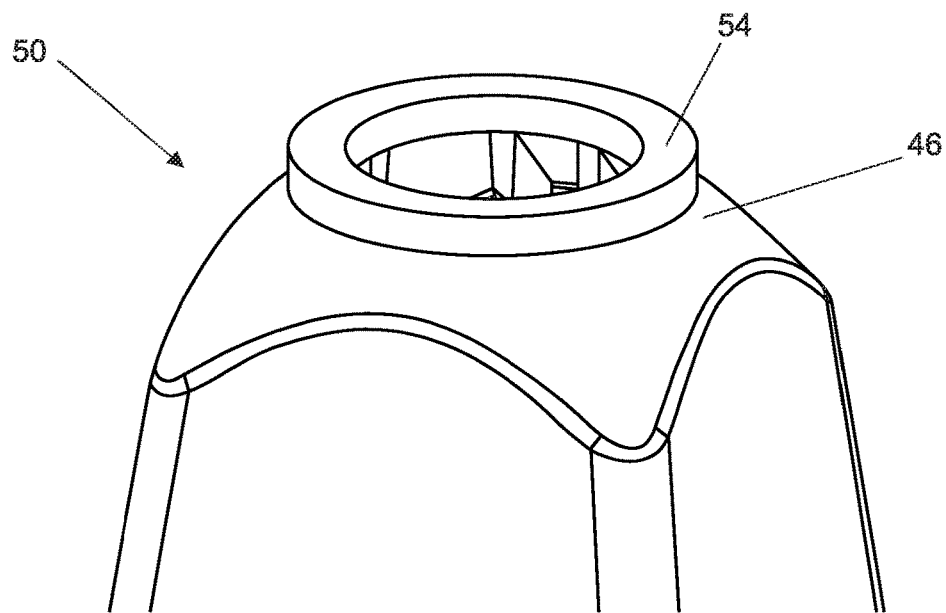
FIG. 4a is a partial perspective view of a cell of a plant tray according to a preferred embodiment of the present invention.
Figure 4B:
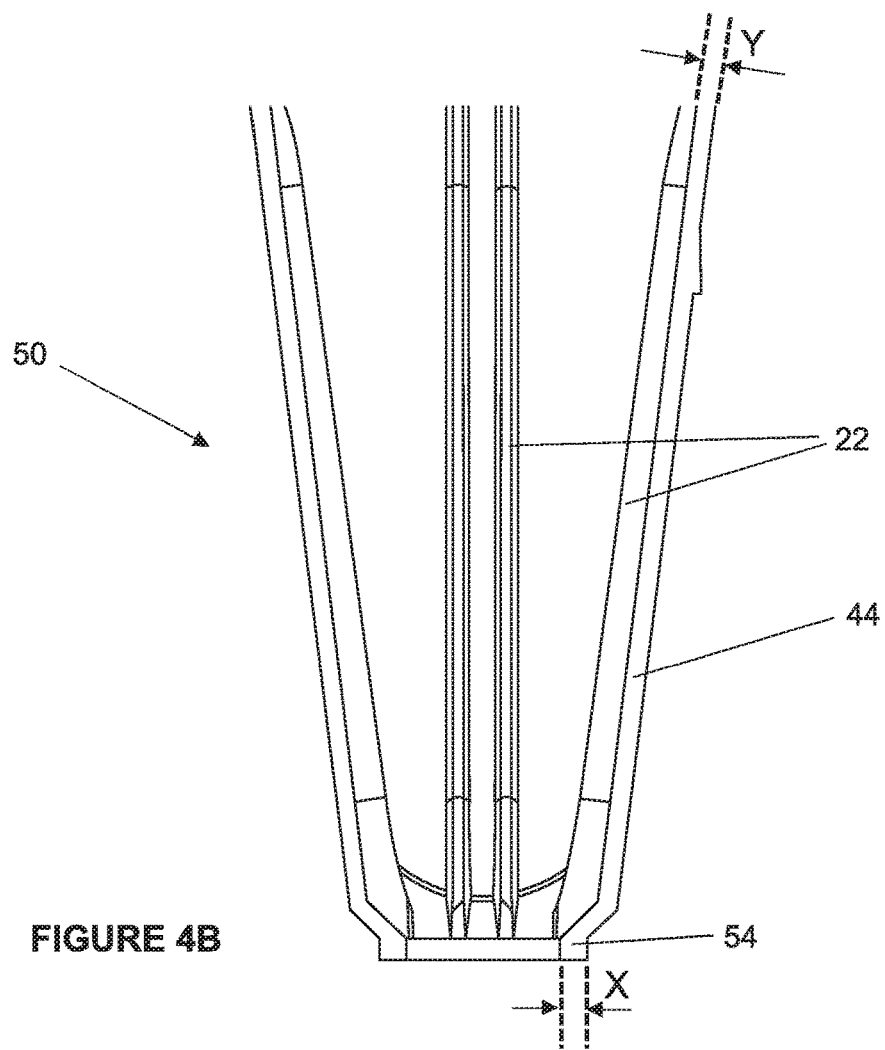

FIGS. 4*a* and 4*b* show the cell 50 of FIG. 3*b*, when it does not contain substrate. The cell 50 has a square cross section with a four-sided inclined side wall 44 and a base 46 which slopes down to a circular drain hole 48 in the centre of the base. A set (or pair) of two parallel ribs 22 is arranged on each of the four sides of the side wall 44, and oriented to extend from the edge of the drain hole 48, over the base, to an upper section of the side wall (not shown).

On the underside of the base 46, a circular rim 54 is arranged to encircle the drain hole 48, so that the inner edge of the rim forms the outer edge of the drain hole. The rim 54 has a thickness X greater than the thickness Y of the side wall.

In the embodiment shown in FIGS. 4a and 4b, the rim 54 has a thickness 2 times greater than the thickness of the side wall 44.

The rim 54 significantly strengthens the base of the cell 50 compared to a similar cell formed without a rim 50.

Figure 5:
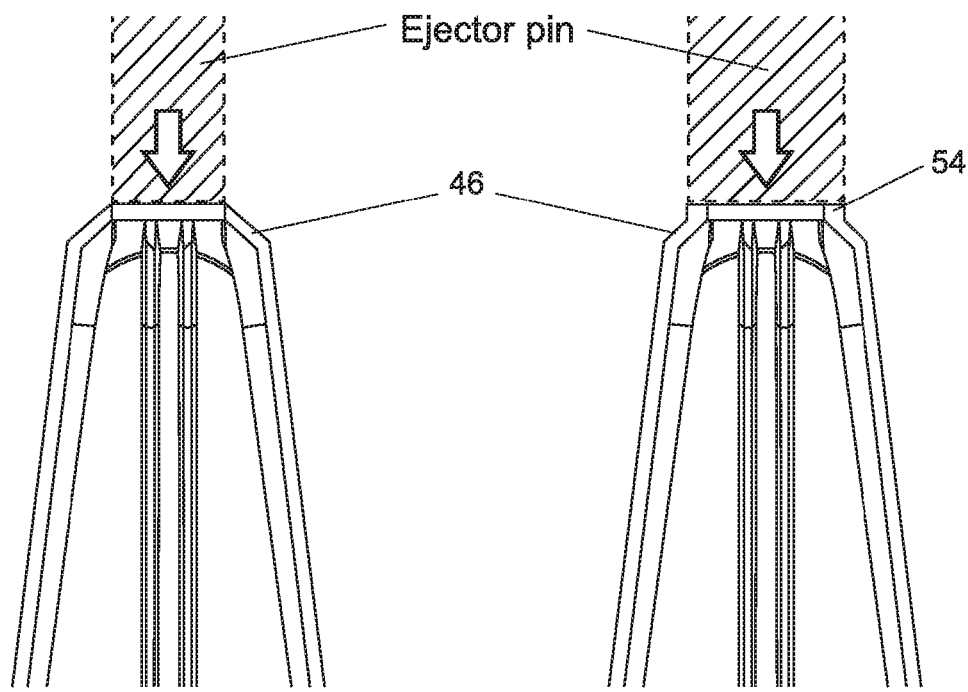
FIG. 5 shows partial vertical cross-sections of two cells, one of which comprises a rim according to an embodiment of the present invention.

As shown in FIG. 5, the rim 54 may also assist in the tray manufacturing process by providing a wider, stronger flat bottom surface against which mould ejector pins may push to eject the multi-cell plant tray from a mould after injection moulding. While a sloped cell base 46 is desirable for improved drainage, and for training roots towards the drain hole 48, sloped cell bases typically provide very little surface area against which mould ejector pins may push. As cells are formed from thin plastic to keep tray weight low, there is therefore a risk that ejector pins can damage sloped cell bases when they eject the tray from the mould.

By providing a thickened rim 54, the cell base is strengthened, and an increased surface area is presented to a mould ejector pin. This allows the use of larger ejector pins, and may spread the force of the ejector pin over a larger area, reducing the risk of damage to the cell.

While the Figures show the use of thickened rims on cells with sloping cell bases, this feature is equally applicable to cells having a side wall which terminates at the drain hole without a separate cell base. In such a cell the thickened rim may be formed on the lower end of the side wall, around the drain hole.

Figure 6:
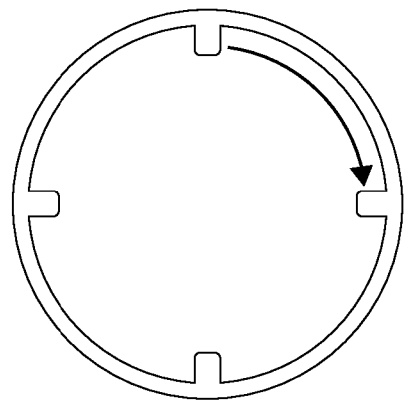
FIG. 6 shows schematic horizontal cross sections of two cells comprising 4 and 8 ribs respectively.
Figure 6:
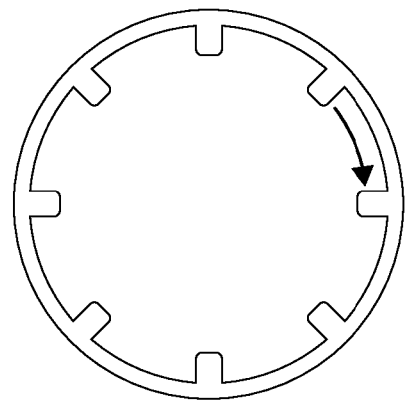

FIG. 6 illustrates cross-sections of two containers having 4 and 8 root-training ribs, respectively. The use of a larger number of vertical root-training ribs spaced around a container wall reduces the angular separation of neighbouring ribs, and so reduces the distance around the container which roots can circle before reaching a root-training rib and being directed towards the bottom of the container. Circling roots are very common in container grown plants, and are extremely bad for plant health. Providing a greater number of root-training ribs, and reducing the angular distance over which roots can circle, may advantageously reduce this problem and create much better root architecture.

FIG. 7a shows a section of a plant tray 60 with a tray top 62 and cells 64 arranged in a regular rectangular array. The upper end of each cell 64 is defined by an octagonal cell opening 66 formed in the tray top 62. A regular array of vents 68 is defined in the tray top between the corners of adjacent cell openings 66. The vents are formed as holes in the tray top 62 through which air may flow in either direction.

In use, the cells 64 are filled with substrate (not shown) through the cell openings.

Each cell 64 has an inclined side wall 70 extending from the cell opening 66 to a drain hole in the bottom of the cell.

As a result of the octagonal cell openings 66, the cells 64 each have an upper section 72 with an octagonal cross-section. In the upper section, the side wall has four opposing rectangular portions arranged between four opposing triangular portions. The rectangular and triangular portions of the side wall are tapered inwards towards the bottom of the cell, so that the portions of the side wall converge into a square cross-section at a transition point 74. Below the transition point 74 is a lower section 76 of the side wall with a square cross-section, which tapers inwards to the drain hole at the bottom of the cell 64. The lower section 76 has a draft angle greater than the draft angle of the upper section 72.

In the preferred embodiment shown in FIG. 7a, the cells 64 also comprise four pairs of parallel ribs 22 positioned around the circumference of the cells, and thickened rims 54 encircling their drain holes, as described above.

As illustrated in FIG. 7b, vents 68 advantageously allow air to flow through the tray top and around the cells 64 during use, improving the microclimate in which plants are grown.

It can be seen that the air void underneath the vent between the cells of the tray is very large, which significantly improves the air flow through the vent.

As shown in FIG. 7c, the use of an octagonal cell opening 66 in cell 60 reduces the surface area of the cell opening compared to a similar square cell 78 of the same overall dimensions. Cell volume is considered to be an important factor in plant propagation, so in order to avoid a decrease in cell volume due to the octagonal cell opening, the height of the transition point 74 and the draft angles of the upper and lower sections 72, 76 of the side wall are controlled to increase the proportion of the cell volume which is provided in the lower half of the cell.

The transition point 74 may be positioned below the tray top by a distance equal to 40-80% of the cell height (measured vertically from cell opening to drain hole).

In the particularly preferred embodiment shown in FIG. 7c, the transition point 74 is positioned below the tray top by a distance equal to 65% of the cell height. In other words, the transition point 74 is positioned above the drain hole by a distance equal to 35% of the cell height.

In the exemplary square cell 78 shown in FIG. 7c, only 22.5% of the cell volume is provided in the bottom half of the cell (in the bottom 50% of the cell's height).

In the octagonal-square cells 60, however, 28% of the cell volume is provided in the bottom half of the cell (in the bottom 50% of the cell's height). This means that 28% of the substrate held in the cell in use will be held in the bottom 50% of the cell's height. By varying the draft angles of the upper and lower sections of the side wall, and the height of the transition point, this proportion may be varied.

Thus, by varying the cross-sectional shape of the side wall 70 over the height of the cell, it is possible to compensate for the reduced surface area of the octagonal cell openings 66 so that substrate volume is not lost from the cell. This is also achieved without the need to vary the cell height or the arrangement of the cell array, which may be particularly advantageous for integration into existing automated tray-handling systems.

The inventor of the present application has found that increasing the relative proportion of substrate in the lower half of the cell may advantageously improve plant growth by providing more space for development of roots in the bottom half of the cell, and by better retaining water in the bottom half of the root ball, or plug, when the plant and substrate are transplanted. After transplant, plants need to survive on stored reserves of water until roots establish out from the root ball into the soil. This is a very critical stage and having a bigger percentage of the soil volume in the lower half i.e. deeper in the soil after transplanting, is beneficial for plant health.

FIGS. 8a and 8b show a section of a plant tray 80 with a tray top 84 and an array of six cells 82 with cell openings formed in the tray top. Vents 86 are formed in the tray top 84 between the cell openings to allow air to flow through the tray top.

As shown in enlarged cross-section in FIG. 8c, vent rims 88 are formed in the tray top around the circumference of the vents 86. The vent rims 88 are configured to extend downwards from the tray top, so that they project under the plane of the tray top. The vent rims project downwards from the tray top at an angle not equal to 90 degrees, so that the vent rims are angled towards the centre of the vent.

In the preferred embodiment shown in FIG. 8c, the vent rims 88 are formed around the circumference of every vent 86 in the tray top 84, and project downwards by a rim height approximately 2 times the thickness of the tray top, and the vent rims project downwards from the tray top at an angle of 82 degrees from the tray top.

The vent rims advantageously strengthen the tray top and add rigidity to the tray top even when a large area of the tray top has been removed to form vents. Typically, removing material from the tray top undesirably weakens the plant tray. By forming vent rims around the vents, however, this problem is avoided while still getting the improved ventilation properties provided by the vents.

The vent rims 88 may be formed by injection moulding using male and female mould halves, in which the male half of the mould has an angled "dome" arranged to project through the vent and below the plane of the tray top before it meets the female mould. This advantageously reduces the likelihood of feather flash forming across vents, and ensures that any feather flash which does form is directed downwards and does not obstruct the vent.

The invention claimed is:

1. A container for propagating plants, the container being configured to receive a substrate for propagating plants and comprising, a drain hole, an inclined side wall, and a plurality of ribs positioned on the side wall and extending into the container, in which at least two ribs are arranged parallel to one another, defining a channel therebetween through which air can flow, in use, when the container contains a substrate, in which the two or more parallel ribs are upwardly oriented and configured to extend from the edge of the drain hole to an upper section of the container, in which the two or more parallel ribs extend inwards from the side wall to a height of less than or equal to 4 mm, and in which the two or more parallel ribs are separated by a distance of less than or equal to 4 mm, so that the parallel ribs form a channel through which air can flow from the drain hole to the upper section of the container, in use.

2. A container according to claim 1, comprising three ribs arranged parallel to one another, such that the three parallel ribs form two channels therebetween through which air may flow, in use, when the container contains a substrate.

3. A container according to claim 1, comprising four ribs arranged parallel to one another, such that the four parallel ribs form three channels therebetween through which air may flow, in use, when the container contains a substrate.

4. A container according to any of claim 1, in which the two or more parallel ribs are separated by a distance of less than or equal to 3 mm, or 2 mm, or 1 mm.

5. A container according to claim 4, in which the two or more parallel ribs extend inwards from the side wall to a height of less than or equal to 3 mm, or 2 mm, or 1.5 mm.

6. A container according to claim 5, in which the height which the two or more parallel ribs extend inwards from the side wall is substantially equal to the separation of the parallel ribs.

7. A container according to claim 5, comprising 4, or 5, or 6, or 8 sets of two, three or four parallel ribs, in which the sets of parallel ribs are upwardly oriented and spaced apart around the side wall of the container.

8. A container according to claim 4, in which the height which the two or more parallel ribs extend inwards from the side wall is substantially equal to the separation of the parallel ribs.

9. A container according to claim 4, comprising 4, or 5, or 6, or 8 sets of two, three or four parallel ribs, in which the sets of parallel ribs are upwardly oriented and spaced apart around the side wall of the container.

10. A container according to claim 4, in which the container comprises a rim, arranged around the drain hole on the underside of the container, in which a thickness of the rim is greater than a thickness of the side wall.

11. A container according to claim 10, in which the thickness of the rim is at least 1.5 times, or 2 times, or 3 times, or four times greater than a thickness of the side wall.

12. A container according to claim 10, in which a portion of the side wall slopes downwards to an edge of the drain hole, and in which the rim comprises a flat bottom surface, so that the rim is configured to provide a flat surface area on the underside of the container.

13. A container according to claim 4, in which the parallel ribs extend to the edge of the drain hole, and in which the height of the parallel ribs at the edge of the drain hole is at least 1 mm, or 2 mm, or 3 mm, or 4 mm, or 5 mm.

14. A container according claim 1, in which the two or more parallel ribs extend inwards from the side wall to a height of less than or equal to 3 mm, or 2 mm, or 1.5 mm.

15. A container according to claim 14, in which the height which the two or more parallel ribs extend inwards from the side wall is substantially equal to the separation of the parallel ribs.

16. A container according to claim 14, comprising 4, or 5, or 6, or 8 sets of two, three or four parallel ribs, in which the sets of parallel ribs are upwardly oriented and spaced apart around the side wall of the container.

17. A container according to claim 14, in which the container comprises a rim, arranged around the drain hole on the underside of the container, in which a thickness of the rim is greater than a thickness of the side wall.

18. A container according to claim 17, in which the thickness of the rim is at least 1.5 times, or 2 times, or 3 times, or four times greater than a thickness of the side wall.

19. A container according to claim 18, in which a portion of the side wall slopes downwards to an edge of the drain hole, and in which the rim comprises a flat bottom surface, so that the rim is configured to provide a flat surface area on the underside of the container.

20. A container according to claim 14, in which the parallel ribs extend to the edge of the drain hole, and in which the height of the parallel ribs at the edge of the drain hole is at least 1 mm, or 2 mm, or 3 mm, or 4 mm, or 5 mm.

21. A container according to claim 1, in which the height which the two or more parallel ribs extend inwards from the side wall is substantially equal to the separation of the parallel ribs.

22. A container according to claim 21, in which the container comprises a rim, arranged around the drain hole on the underside of the container, in which a thickness of the rim is greater than a thickness of the side wall.

23. A container according to claim 22, in which the thickness of the rim is at least 1.5 times, or 2 times, or 3 times, or four times greater than a thickness of the side wall.

24. A container according to claim 22, in which a portion of the side wall slopes downwards to an edge of the drain hole, and in which the rim comprises a flat bottom surface, so that the rim is configured to provide a flat surface area on the underside of the container.

25. A container according to claim 21, in which the parallel ribs extend to the edge of the drain hole, and in which the height of the parallel ribs at the edge of the drain hole is at least 1 mm, or 2 mm, or 3 mm, or 4 mm, or 5 mm.

26. A container according to claim 1, in which the two or more parallel ribs are configured to extend into, or across, the drain hole.

27. A container according to claim 1, comprising 2, or 3, or 4, or 5, or 6, or 8 sets of two, three or four parallel ribs, in which the sets of parallel ribs are upwardly oriented and spaced apart around the side wall of the container.

28. A container according to claim 1, in which the container comprises a rim, arranged around the drain hole on the underside of the container, in which a thickness of the rim is greater than a thickness of the side wall.

29. A container according to claim 28, in which the thickness of the rim is at least 1.5 times, or 2 times, or 3 times, or four times greater than a thickness of the side wall.

30. A container according to claim 29, in which the parallel ribs extend to the edge of the drain hole, and in which the height of the parallel ribs at the edge of the drain hole is at least 1 mm, or 2 mm, or 3 mm, or 4 mm, or 5 mm.

31. A container according to claim 28, in which a portion of the side wall slopes downwards to an edge of the drain hole, and in which the rim comprises a flat bottom surface, so that the rim is configured to provide a flat surface area on the underside of the container.

32. A container according to claim 28, in which the parallel ribs extend to the edge of the drain hole, and in which the height of the parallel ribs at the edge of the drain hole is at least 1 mm, or 2 mm, or 3 mm, or 4 mm, or 5 mm.

33. A container according to claim 1, in which the parallel ribs extend to the edge of the drain hole, and in which the height of the parallel ribs at the edge of the drain hole is at least 1 mm, or 2 mm, or 3 mm, or 4 mm, or 5 mm.

34. A container according claim 1, comprising a substrate contained in the container, in which the substrate does not fill the channel formed between the parallel ribs.

35. A container according claim 1, in which the container is formed as an individual unit.

36. A container according to claim 1, in which the container is a cell of a plant tray comprising a plurality of cells.

* * * * *